United States Patent [19]

Lemke

[11] Patent Number: 5,551,468
[45] Date of Patent: Sep. 3, 1996

[54] FLUIDIC DENSITY CONTROL FOR CHLOR ALKALI CELLS

[76] Inventor: Chris A. Lemke, 3727 N. Hughes Ave., Fresno, Calif. 93722

[21] Appl. No.: 380,236

[22] Filed: Jan. 30, 1995

Related U.S. Application Data

[63] Continuation of Ser. No. 177,760, Jan. 4, 1994, abandoned.

[51] Int. Cl.$^6$ .................................................. G05D 21/02
[52] U.S. Cl. .................................................. 137/3; 137/91
[58] Field of Search ................................................ 137/3, 91

[56] References Cited

U.S. PATENT DOCUMENTS

| | | | |
|---|---|---|---|
| 2,543,522 | 2/1951 | Cohen | 137/91 |
| 3,089,502 | 5/1963 | Davidson et al. | 137/91 |
| 4,422,085 | 12/1983 | Sumitomo et al. | 137/91 X |
| 4,601,306 | 7/1986 | Engelhardt et al. | 137/91 |
| 4,825,228 | 4/1989 | Gloeckler | 137/93 X |
| 4,899,774 | 2/1990 | Keller | 137/4 |
| 5,013,488 | 5/1991 | Abadi et al. | 137/91 X |

*Primary Examiner*—Stephen M. Hepperle

[57] ABSTRACT

The density of a caustic solution is reduced by automatically adding water to the caustic solution when the specific gravity of the caustic solution is unacceptably high. The mechanism consists of a flow control valve that is controlled by an switch that monitors the position of a hydrometer. The switch is activated when the density of the caustic solution rises to unacceptable levels, causing the hydrometer to rise and activate the switch. The switch controls a valve that opens and allows water to enter the caustic solution reservoir, thereby diluting the caustic solution. When sufficient water has been added to the caustic, the hydrometer drops and the switch is deactivated, thereby closing the valve that allows water to enter the caustic solution reservoir. Excess caustic solution leaves the reservoir through an overflow on the reservoir.

8 Claims, 8 Drawing Sheets

FLUIDIC DENSITY CONTROL FOR CHLOR ALKALI CELLS

This application is a continuation of Ser. No. 177,760, filed Jan. 4, 1994, now abandoned.

BACKGROUND-FIELD OF THE INVENTION

This invention relates, generally, to improvements in electrolytic cells that generate chlorine gas and caustic solutions and delivers those products to a drinking water supply system, wastewater treatment system, industrial processing system, or a swimming pool. More particularly, it relates to an improved means for controlling the density of the caustic liquid therein.

BACKGROUND-DESCRIPTION OF PRIOR ART

U.S. Pat. No. 4,899,774 (1990) and the references to record therein are believed to represent the most relevant prior art to this disclosure.

Chlor-alkali cells provide an electromotive force to split the chemical bond between sodium and chlorine elements of ordinary sodium chloride (table salt). Chlorine is used as a disinfectant in water, wastewater, and swimming pool applications. Chlorine is also used as an oxidant in water, wastewater, and industrial treatment processes. The sodium produced from the process combines with water to form sodium hydroxide (caustic) which is used as a disinfectant and pH control chemical in water, wastewater and swimming pool applications. Caustic is also used as a cleansing chemical agent in several processes.

The chlor-alkali process in its simplest form, employs the use of an anode electrode, cathode electrode, and a membrane placed between the two electrodes that provides isolation of the caustic and salt brine. The cathode portion of the cell provides a continuous influx of sodium into the caustic, thereby increasing the concentration of the caustic. A high concentration of caustic will cause excessive wear on the membrane. Therefore, it is desirable to keep the concentration of the caustic at a level that promotes the necessary electrical conductivity, and low enough to prevent premature wear of the membrane.

One method to measure the concentration of caustic is to determine the density of the caustic. The most common method to determine density is by specific gravity comparison using a hydrometer. The prior art utilizes a specially designed hydrometer of known specific gravity to determine the density of caustic. Buoyant forces imposed on the hydrometer cause the hydrometer to rise when the concentration of caustic increases. The hydrometer rises to an elevation that intercepts a horizontally projected stream of water to dilute the caustic solution.

The claims in the prior art describe an apparatus that prevents the density of the caustic from exceeding a high unacceptable density limit. As mentioned previously, this is important from the standpoint of membrane maintenance of the chlor-alkali cell operation. The claims however, will not allow the cell to achieve density equilibrium until after the nozzle that produces the horizontally projected stream of water and the bypass collection port are submerged by the caustic. This is because the claims do not describe how the elevation of the specially designed hydrometer is maintained in necessary reference to the elevation of the horizontal dilution stream.

The apparatuses and method described in the prior art claims would provide dilution to the caustic since the hydrometer would rise and intercept the horizontally projected dilution stream, and therefore deflect a portion of the dilution stream into the caustic. However, the liquid elevation of the caustic would increase, thereby changing the reference elevation associated with the specially designed hydrometer. Since the elevation of the caustic liquid surface is increased, the hydrometer will now intercept the horizontally projected dilution stream at a lower density limit. Eventually, the dilution cycle would continue until enough dilution water is added causing the elevation of the caustic liquid surface to intercept the elevation of the horizontally projected dilution stream. This condition would make the specially designed hydrometer ineffective for its designed purpose, and render the cell nearly inoperative due to the decreased catholyte electric conductivity.

Although the specification of the prior art illustrates means to maintain the necessary reference elevation between the caustic liquid level and the horizontally projected dilution stream, there is no assurance that the apparatuses and method claimed in the prior art will maintain the necessary lower density limit. This is essential in terms of maintaining the necessary electrolyte conductivity for the chlor-alkali cell operation.

The dilution water added to the caustic should be softened to remove the calcium that impairs the function of the membrane (thus impairing the function of the chlor-alkali cell). The prior art apparatus employs a continuously flowing source of dilution water, whereby a significant portion of the dilution water bypasses the caustic reservoir and is not used for dilution purposes. The prior art indicates that the water bypassing the dilution apparatus is recycled. If the water is recycled back to the dilution mechanism, the recycled water must be re-pressurized to obtain the necessary horizontal projection of the dilution stream. The cost of recycling the dilution water solely for this purpose is generally cost prohibitive. Also, the cost of continuously providing a treated source of water to the prior art dilution apparatus is great when compared to a system that employs 100 percent of the dilution water (no bypass) into the caustic reservoir.

The apparatus described in the prior art utilizes a nozzle to develop the horizontally projected solution stream. The small orifice of the nozzle is subject to plugging by small particles in the dilution water source, especially if the source of water is untreated. A partially plugged nozzle may prevent the horizontally projected stream from reaching the bypass destination (collection reservoir) and enter directly into the caustic reservoir, thus prematurely diluting the caustic. A fully plugged nozzle will remove the dilution source from the apparatus causing the density of the caustic to exceed the high unacceptable limit. Either scenario outlined above is undesirable from the standpoint of cell operation and membrane maintenance.

The prior art apparatus distributes the deflected dilution water at the surface of the caustic solution in the area immediately surrounding the hydrometer. Considering that the density of the dilution water is less than the density of the caustic, the dilution water added at the surface would tend to remain at the surface. The variable density gradient produced by this method is undesirable from the standpoint of membrane maintenance and cell operation. Mixing of the caustic would need to be employed to assure homogeneous density distribution throughout the entire caustic reservoir. This is needed for the hydrometer to determine the actual density of the caustic in the cell. The optimum location to add the dilution water would be near the bottom of the cell. The lower density dilution water would be more buoyant than the higher density caustic liquid causing the lower density liquid to rise in the cell, thus creating natural mixing and a virtually homogeneous density distribution.

When directly using the chlor-alkali process for supplying chemicals to a public water supply system, it is important to note that many state and local regulations do not allow the introduction of recycled water into a water system without appropriate treatment. The dilution water apparatus described in the prior art provides an entry point of potential contamination either through natural means or by sabotage. A sealed chlor-alkali cell with no bypass or recycled dilution water would be desired.

In summary, the apparatus described in the prior art employs a unique method to introduce dilution water into a caustic solution. However, several improvements are needed to make the apparatus safe and reliable. The following are disadvantages known to exist with the prior art.

(a) There is no assurance that the prior art will employ the reference means between the hydrometer and the horizontally projected dilution stream to maintain the necessary lower density limit of a caustic solution.

(b) The cost of supplying a "calcium free" dilution stream can be costly when considering the significant portion of the dilution stream that bypasses the caustic reservoir.

(c) The nozzle used to create the horizontally projected solution stream is subject to plugging by small particles in the dilution water. Partial plugging will cause the dilution stream to enter directly into the caustic reservoir causing premature caustic dilution. Total nozzle plugging will eliminate the dilution stream causing the density of the caustic to exceed the unacceptable density limit.

(d) The dilution water is added to the surface of the caustic liquid. Since the density of the dilution water is less than the density of caustic, a non-homogeneous density gradient will be experienced if mixing is not employed. The concentration of caustic output and the operation of the system will be inconsistent.

(e) The generation of a recycled water often requires further treatment of the water to be recycled in drinking water systems. The dilution water bypassing the dilution apparatus provides an entry point of potential contamination either by natural means or by sabotage.

OBJECTS AND ADVANTAGES

Accordingly, several objects and advantages of my invention are:

(a) to automatically maintain a desirable density range of a caustic solution in a chlor-alkali cell where the cell promotes an increasing dynamic density flux upon the caustic solution;

(b) to allow 100 percent of all water available for dilution to be added to the caustic solution only when dilution water is needed, where no dilution water is bypassed, wasted, or recycled, thus reducing the cost of providing calcium removal and other required treatment to the dilution water;

(c) to provide a sufficiently sized dilution water orifice that reliably controls the desired flow of dilution water added to the caustic solution;

(d) to add dilution water to a caustic solution at the location that promotes natural mixing, thereby achieving a homogeneous caustic solution;

(e) to reduce the potential of system contamination by providing enclosures that seal all components of the invention from the outside environment.

Further objects and advantages will become apparent from a consideration of the ensuing description and drawings.

DESCRIPTION OF DRAWINGS

For a fuller understanding of the nature and objects of the invention, reference should be made to the following detailed description, taken in consideration with the accompanying drawings in which:

FIG. 1 illustrates an electrolytic cell with caustic at a desirable density range. FIG. 1A illustrates the flow of dilution water into an electrolytic cell with caustic at an unacceptable high range.

FIG. 2 illustrates the position of the hydrometer when the density of the caustic is within an acceptable range. FIG. 2A illustrates the position of the hydrometer when the density of the caustic is within an unacceptable range.

FIG. 3 illustrates the position of the hydrometer when the density of the caustic is within an acceptable range. FIG. 3A illustrates the position of the hydrometer when the density of the caustic is within an unacceptable range.

FIG. 4 illustrates an open circuit that occurs when the hydrometer is located at a position illustrated in FIG. 3. FIG. 4A illustrates a closed circuit that occurs when the hydrometer is located at a position illustrated in FIG. 3A.

FIG. 5 illustrates an open circuit that occurs when the hydrometer is located at a position illustrated in FIG. 3. FIG. 5A illustrates a closed circuit that occurs when the hydrometer is located at a position illustrated in FIG. 3A.

FIG. 6 illustrates the position of the hydrometer when the density of the caustic is within an acceptable range whereby no dilution water is added to the caustic. FIG. 6A illustrates the position of the hydrometer when the density of the caustic is at an unacceptable high range, whereby the hydrometer activates a switch that closes an electrical circuit that causes a valve control to open a valve that allows dilution water to enter the caustic reservoir.

FIG. 7 illustrates the position of the hydrometer when the density of the caustic is within an acceptable range whereby no dilution water is added to the caustic. FIG. 7A illustrates the position of the hydrometer when the density of the caustic is at an unacceptable high range, whereby the hydrometer activates a switch that closes a circuit that causes a valve control to open a valve and allow dilution water to enter the caustic reservoir.

FIG. 8 illustrates photoelectric switches in communication with a piston type hydrometer apparatus. FIG. 8A illustrates photoelectric switches in communication with an emerged body type hydrometer apparatus.

LIST OF REFERENCE NUMERALS

| 10 | catholyte reservoir | 12 | caustic |
|---|---|---|---|
| 14 | outlet | 14A | outlet port |
| 16 | inlet | 20 | hydrometer apparatus |
| 20A | piston type hydrometer | 20B | emerged body type hydrometer |
| 21 | emerged body | | |
| 22 | enclosed body | 21' | higher density emerged body |
| 24 | removable stem | | |
| 25B | access port | 23 | emerged body enclosure |
| 27 | emerged body stop | 25A | access port |
| 30 | opening | 26 | hydrometer sleeve housing |
| 34 | switch containment housing | | |
| | | 28 | liquid |
| 35 | dilution water control reference elevation | 32 | sealed threaded connection |
| 35' | secondary dilution water control reference elevation | | |
| 36 | hydrometer activation reference elevation | | |
| 37 | activation differential elevation | | |
| 38 | hydrometer differential elevation | | |
| 39 | hydrometer base reference elevation | | |
| 40 | dilution water control apparatus | 42 | valve |
| | | 46 | energy source |
| 44 | valve control | 50 | switch |
| 48 | circuit | 50B | snap action switch |
| 50A | photoelectric switch | 52 | photoelectric light source |
| 51 | switch body | | |
| 53 | activation lever arm | 54 | photoelectric light receiver |
| 56 | retroreflective target | | |
| 60 | dilution water reservoir | 58 | light beam |
| 64 | dilution water inlet | 62 | dilution water |

SUMMARY

The present invention employs a hydrometer disposed in the caustic solution as in the earlier patent, but the need for an unreliable dilution stream with bypassed or recycled water is eliminated. Instead, means are provided to dilute the caustic by mechanisms that allow all the dilution water available to enter the caustic chamber only when needed, allow dilution water to be added at a location that promotes natural mixing, and provide an orifice controlling the flow of dilution water entering the caustic chamber of sufficient size to prevent plugging by small particles.

Specifically, when the density of the caustic solution increases, a hydrometer apparatus raises and activates a switch on the dilution water control system. An activated switch opens a control valve on a pipeline that allows dilution water to enter the caustic reservoir. As the water enters the reservoir, the caustic is diluted, causing the hydrometer apparatus to drop. As the hydrometer drops the switch is de-activated, causing the control valve on the dilution water pipeline to close. Therefore, the invention allows precise, reliable control of adding dilution water to a caustic influenced by a dynamic density gradient.

It is therefore understood that the primary objective of this invention is to provide an economically reliable automatic fluid density control system for chlor-alkali and similar electrolytic cells.

DESCRIPTION OF INVENTION

The configuration of the invention can partake several forms. It is the intention of this narrative to describe a few of the forms in detail.

Figure 1:
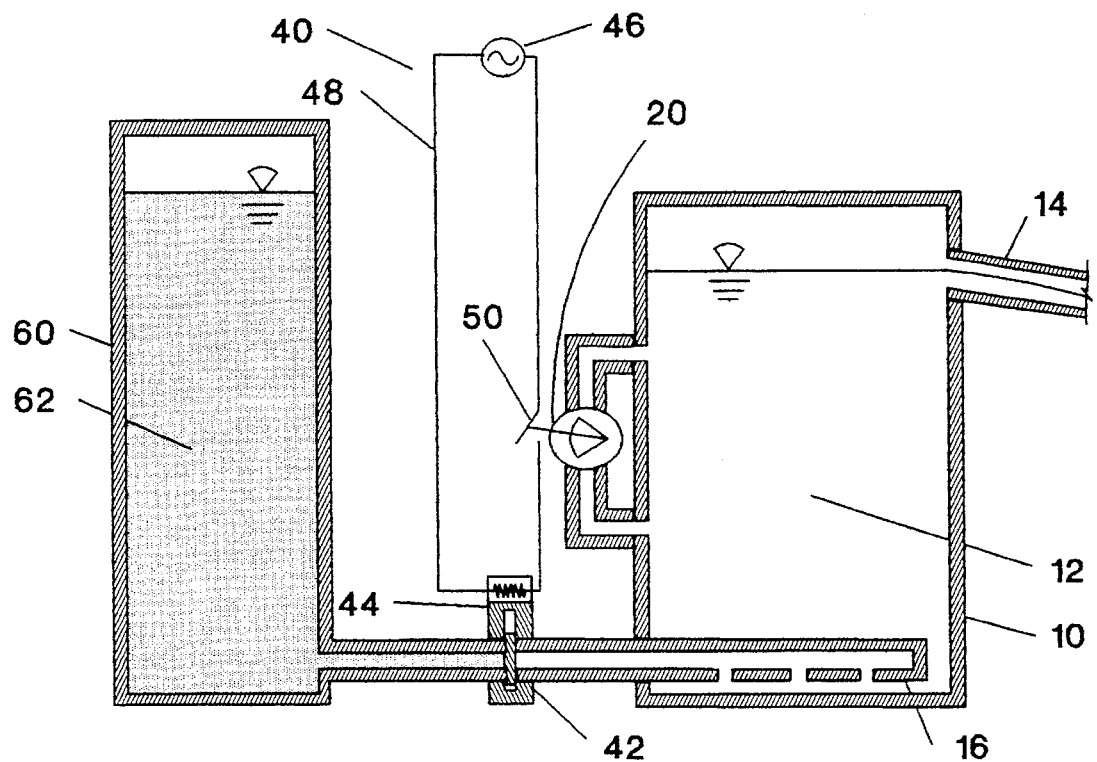
FIGS. 1 and 1A are schematic representations of the invention showing a electrolytic cell containing a caustic liquid, a hydrometer apparatus measuring the density of the caustic liquid, and a dilution water control apparatus that controls the flow of dilution water into the electrolytic cell.

A schematic representation of the invention is illustrated in its simplest form by FIG. 1. As shown in FIG. 1, the invention is comprised of a hydrometer apparatus 20 that measures density of a caustic 12 contained in a catholyte reservoir 10. Hydrometer apparatus 20 is in communication with a dilution water control apparatus 40 that regulates flow of a dilution water 62 from a dilution water reservoir 60 into catholyte reservoir 10 through inlet 16. Displaced caustic 12 in catholyte reservoir 10 exits through an outlet 14.

Figure 1A:
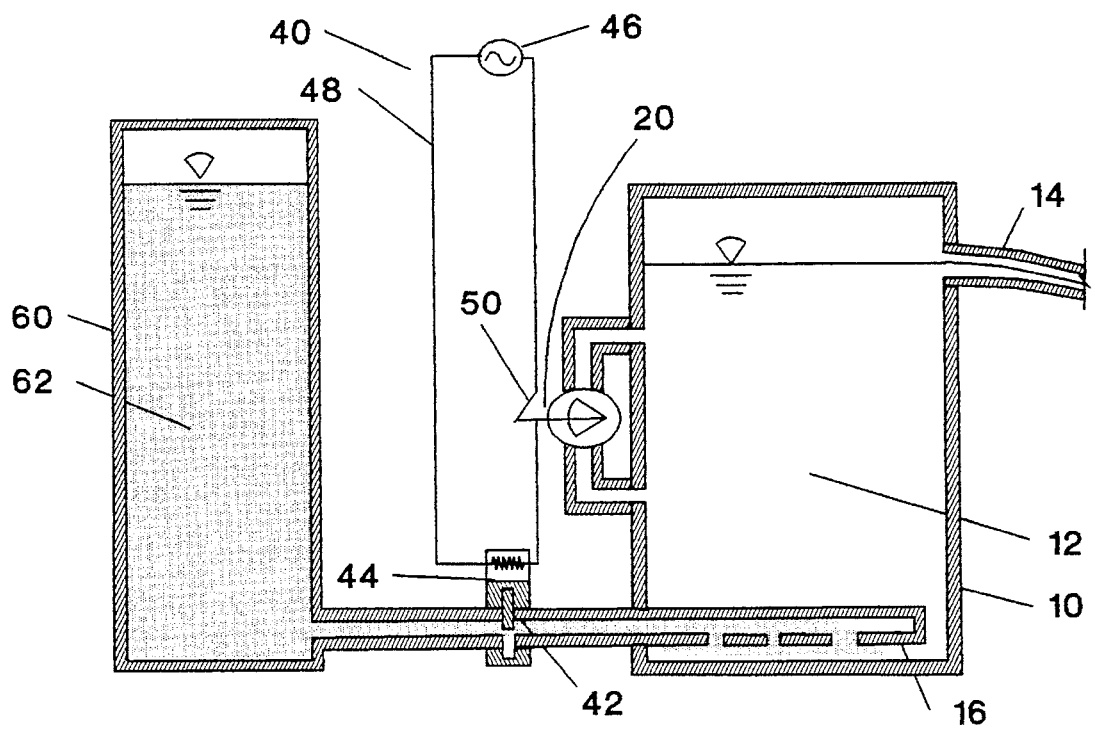

Dilution water control apparatus 40 is comprised of a valve 42, operated by a solenoid or motorized valve control 44, powered by an energy source 46, supplied by a circuit 48, having a switch 50. Valve 42 is closed with energy source 46 removed from circuit 48 by open switch 50 (FIG. 1). Valve 42 is open with energy source 46 supplied to valve control 44 through circuit 48 by closed switch 50 (FIG. 1A). Valve 42 is connected in-line with inlet 16 that provides means for dilution water 62 to enter catholyte reservoir 10.

Figure 2:
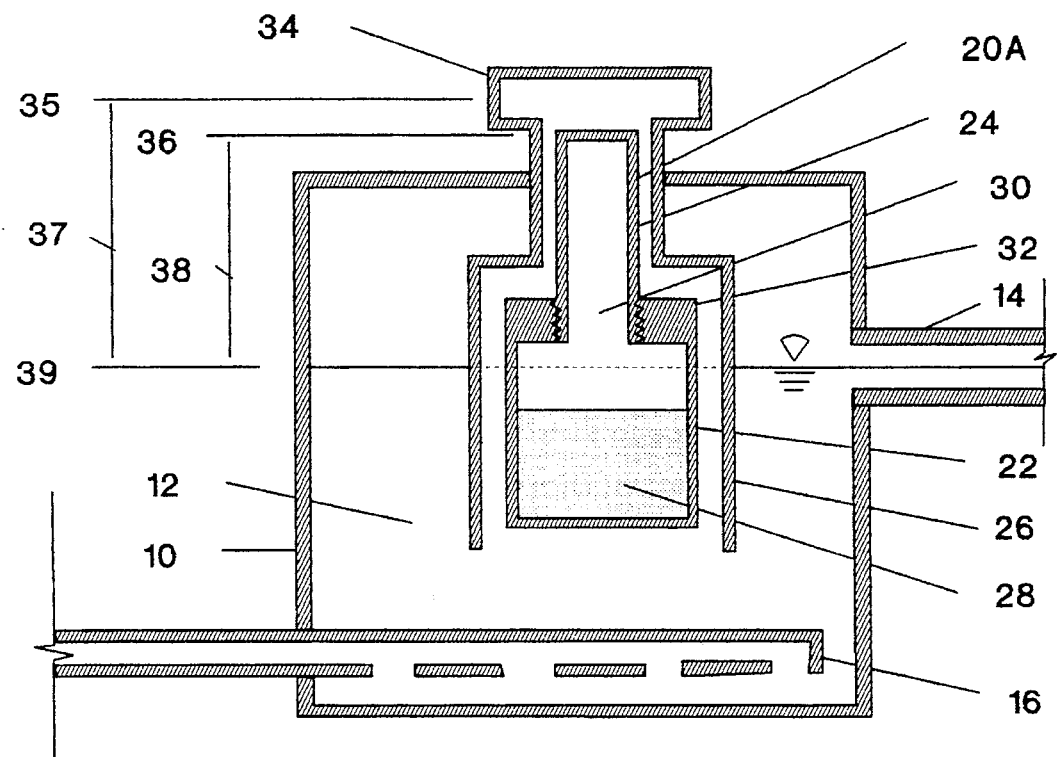
FIGS. 2 and 2A are illustrations of a piston type hydrometer apparatus disposed in a caustic solution.
Figure 3:
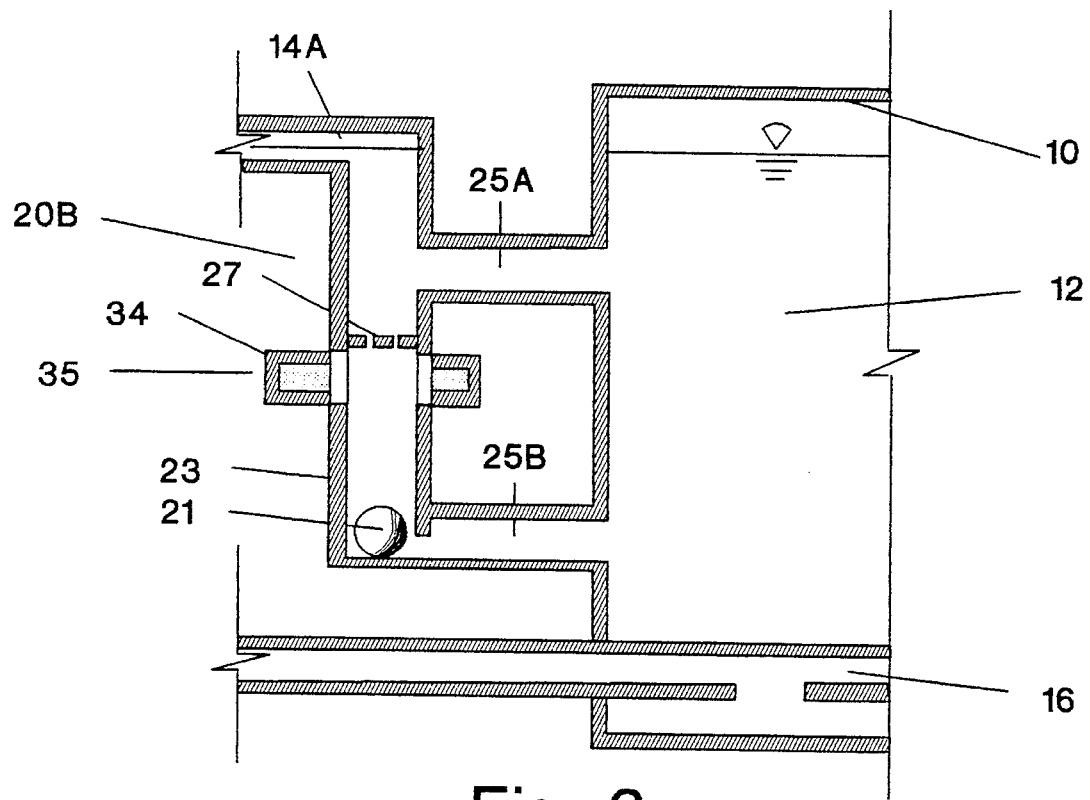
FIGS. 3 and 3A are illustrations of an emerged body type hydrometer apparatus disposed in a caustic solution.

FIGS. 2 and 3 illustrate two variations of hydrometer apparatus 20 mounted to catholyte reservoir 10. FIG. 2 illustrates a piston type hydrometer 20A mounted directly within the interior of catholyte reservoir 10. FIG. 3 illustrates an emerged body type hydrometer 20B attached to the exterior of catholyte reservoir 10. Piston type hydrometer 20A can also be mounted to the exterior of catholyte reservoir 10 in a similar fashion to emerged body type hydrometer 20B.

Piston type hydrometer 20A shown in FIG. 3 is comprised of a removable stem 24 attached to an enclosed body 22 contained in a hydrometer sleeve housing 26. A liquid 28 is contained within enclosed body 22 providing the desired density rating of piston type hydrometer 20A. Liquid 28 is added into enclosed body 22 through an opening 30 where removable stem 24 is attached to top of enclosed body 22 by a sealed threaded connection 32. Therefore, the interior of piston type hydrometer 20A is isolated from the exterior environment.

Piston type hydrometer 20A is suspended in caustic 12 where gravitational forces caused by the weight of piston type hydrometer 20A and the associated buoyant forces produced by caustic 12 are equal. Hydrometer sleeve housing 26 provides virtually frictionless containment of piston type hydrometer 20A allowing unencumbered vertical movement of piston type hydrometer 20A in caustic 12. Buoyant forces imposed on piston type hydrometer 20A by caustic 12 provide a hydrometer differential elevation 38 between a hydrometer base reference elevation 39 and a hydrometer activation reference elevation 36. Hydrometer base reference elevation is maintained by outlet 14 connected to catholyte reservoir 10. Differential elevation 38 therefore varies with density of caustic 12.

Hydrometer sleeve housing 26 is fixed below a switch containment housing 34 providing a dilution water control reference elevation 35. An activation differential elevation 37 is developed between dilution water control reference elevation 35 and hydrometer base reference elevation 39.

Figure 2A:
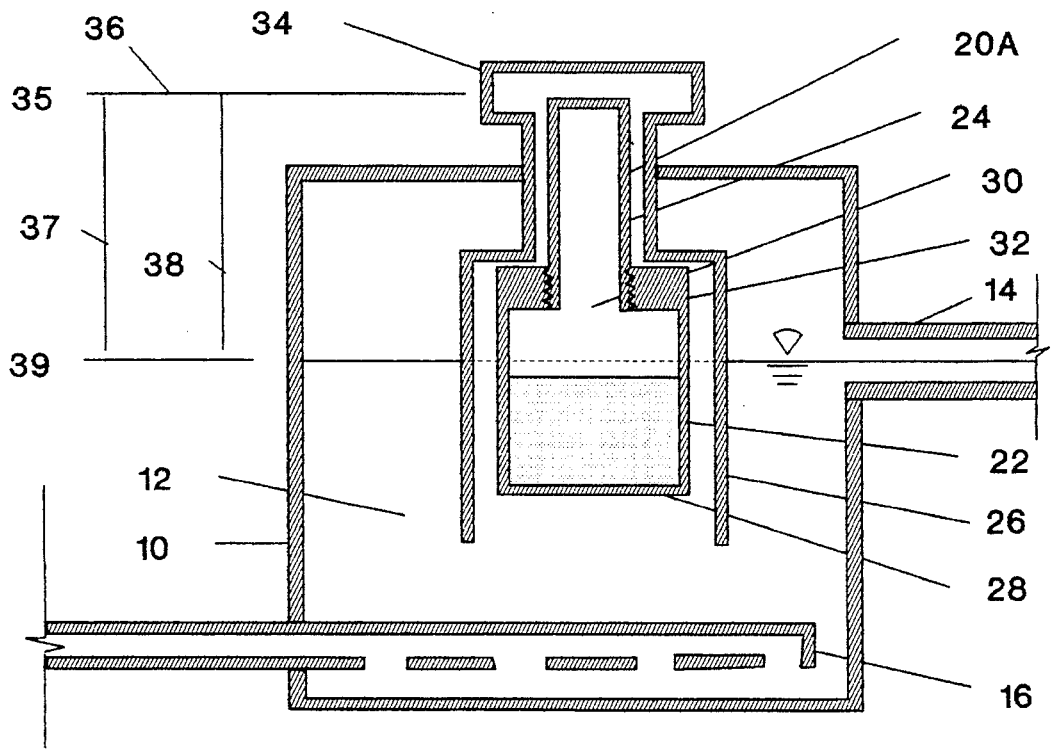

Activation differential elevation 37 remains constant and represents the vertical distance at which piston type hydrometer 20A extends above the liquid surface of caustic 12 when density of caustic 12 is at the maximum desirable density limit (FIG. 2A). Therefore hydrometer differential elevation 38 and activation differential elevation 37 are the same when maximum desirable density limit of caustic 12 is reached.

Emerged body type hydrometer 20B shown in FIG. 3 is comprised of an emerged body 21 contained in an emerged body enclosure 23. Emerged body enclosure 23 provides virtually frictionless containment of emerged body 21 allowing unencumbered vertical movement of emerged body 21 within emerged body 23. Switch containment housing 34 is fastened to emerged body enclosure 23 at an elevation higher than the top elevation of emerged body 21 at its lowest position within emerged body enclosure 23 (FIG. 3). Emerged body enclosure 23 is constructed of a transparent plastic or glass allowing clear visual observation of emerged body 21. Emerged body 21 is non-transparent and is composed of a material with the same specific gravity of caustic 12 at the maximum desirable density limit.

Emerged body type hydrometer 20B is fastened to catholyte reservoir 10 by an access port 25A and an access port 25B. Access ports 25A and 25B provide open enclosure with the interior of catholyte reservoir 10 thus allowing entry of caustic 12 into emerged body enclosure 23. An outlet port 14A is fixed to the upper portion of emerged body enclosure 23 providing an outlet for displaced caustic 12 in catholyte reservoir 10 and emerged body enclosure 23. An emerged body stop 27 is fixed within the horizontal cross-sectional interior of emerged body enclosure 23 slightly above dilution water control reference elevation 35 provided by switch containment housing 34. Emerged body stop 27 is perforated allowing flow of caustic 12 through emerged body enclosure 23 when emerged body 21 is located at any location below emerged body stop 27. Liquid level elevation of caustic 12 exceeds dilution water control reference elevation 35.

Figure 3A:
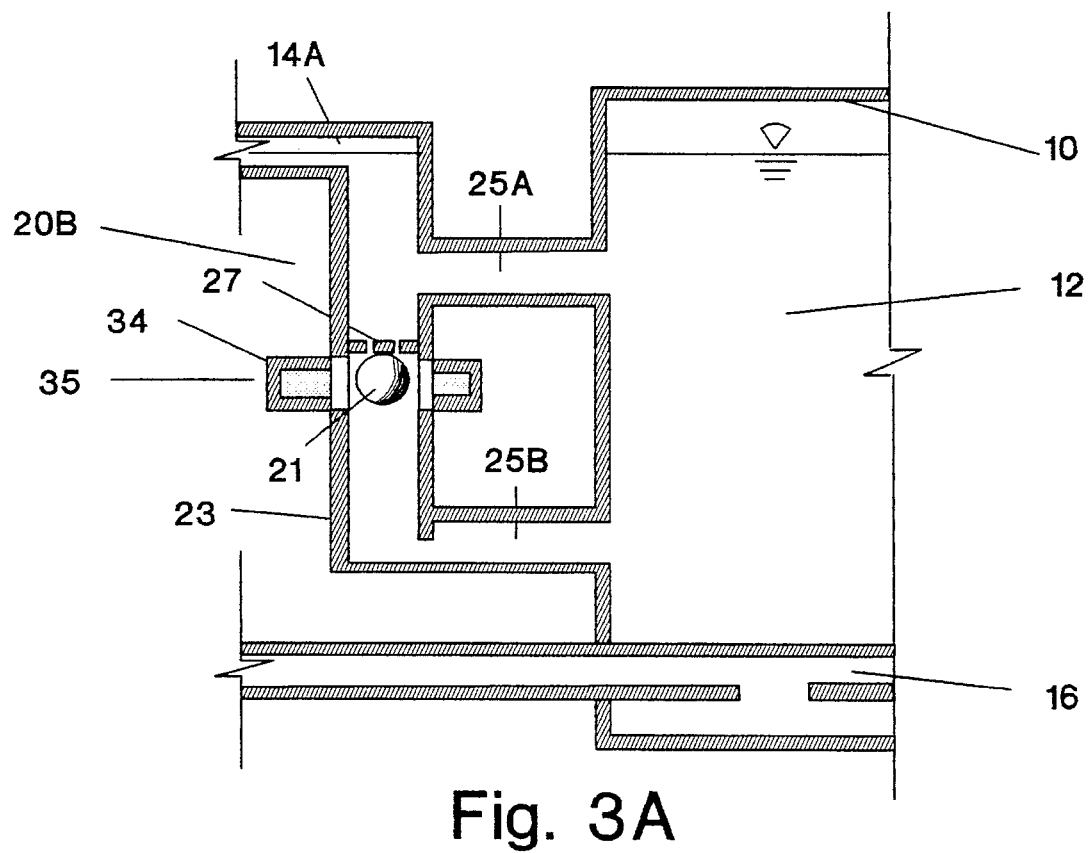

Buoyant forces imposed on emerged body 21 by caustic 12 cause emerged body 21 to rise when density of caustic 12 exceeds the maximum desirable density limit. Rising of emerged body 21 is stopped by emerged body stop 27 at the intersection of dilution water control reference elevation 35 (FIG. 3A).

Figure 4:
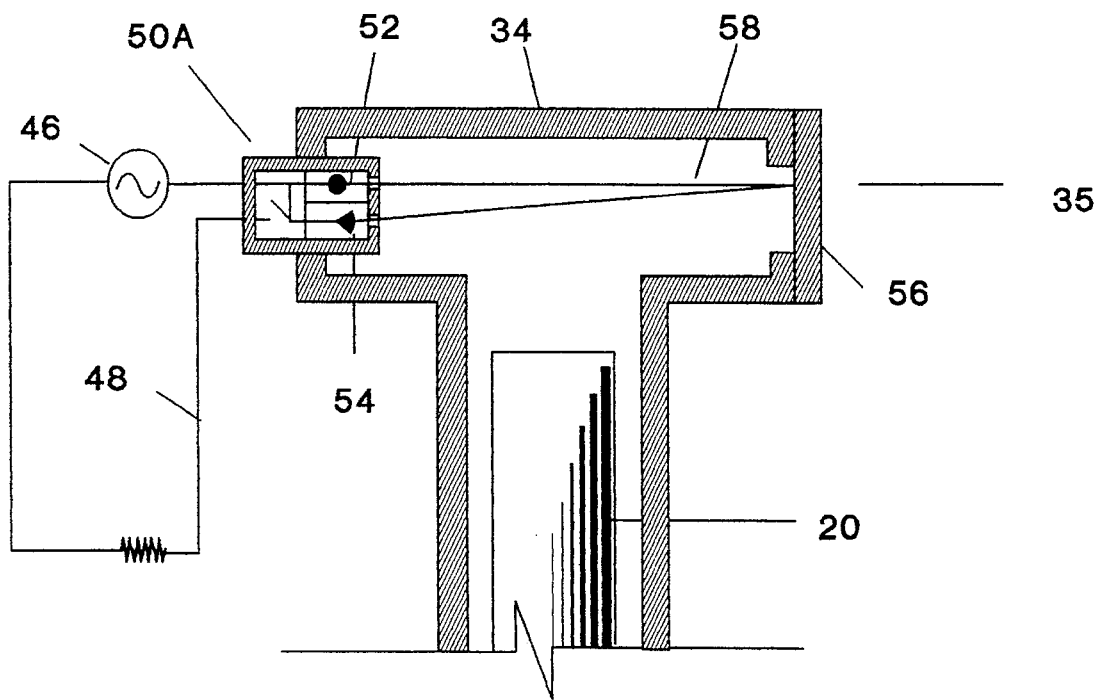
FIGS. 4 and 4A are illustrations of a photoelectric switch contained within a housing that provides the necessary communication with the hydrometer apparatus.
Figure 5:
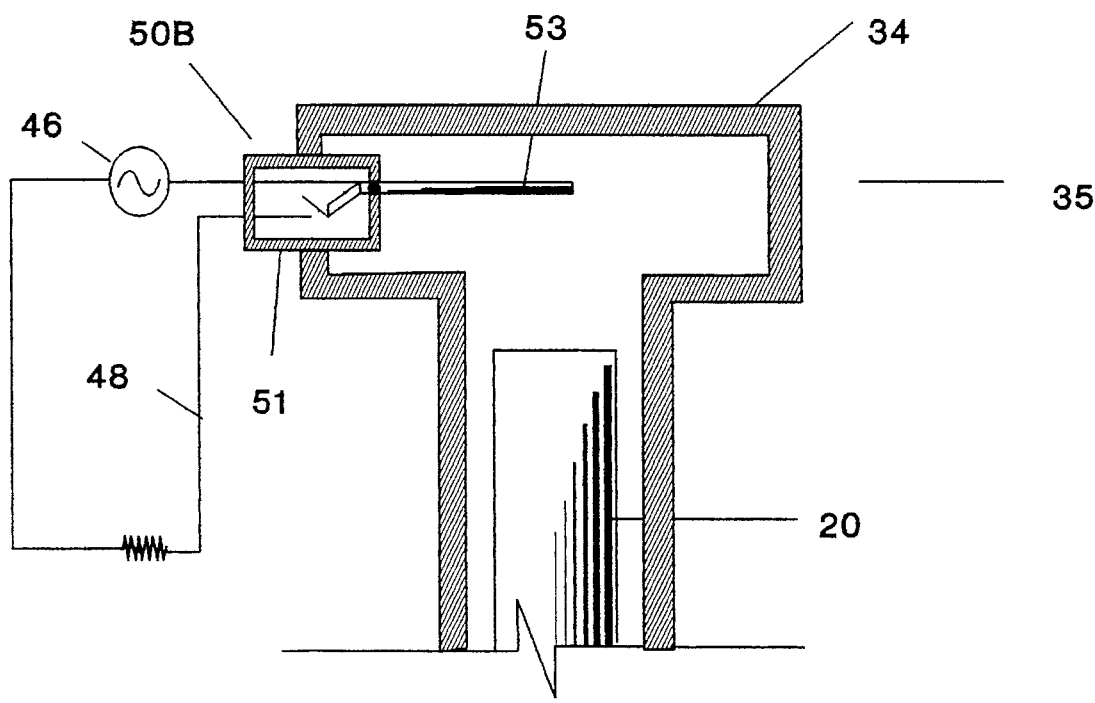
FIGS. 5 and 5A are illustrations of a snap action switch contained within a housing that provides the necessary communication with the hydrometer apparatus.

FIGS. 4 and 5 illustrate two variations of a switch 50 mounted in switch containment housing 34 at dilution water control reference elevation 35. A photoelectric switch 50A is shown in FIG. 4 and can be used with either type of hydrometer apparatus 20 described above. A snap action switch 50B is shown in FIG. 5 and can be used with piston type hydrometer 20A (FIG. 2).

Figure 4A:
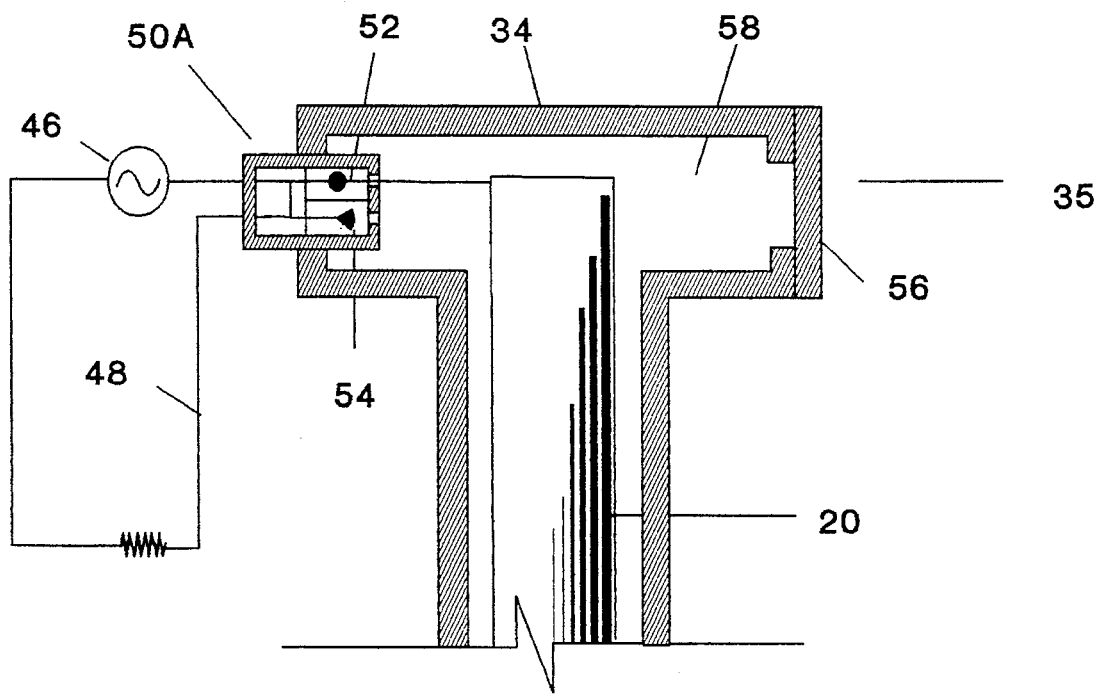

Photoelectric switch 50A shown in FIG. 4 is comprised of a photoelectric light source 52 and a photoelectric light receiver 54 located in diametric opposition to retroreflective target 56. Photoelectric switch 50A is connected to circuit 48 that provides energy source 46 to valve control 44. A light beam 58 is continuously emitted from photoelectric light source 52 when energy source 46 is connected to photoelectric switch 50A. Photoelectric switch 50A is positioned in switch containment housing 34 to emit light beam 58 at dilution water control reference elevation 35. Photoelectric switch 50A provides an open circuit 48 when a light beam 58 emitted from photoelectric light source 50 reflects off retroreflective target 56 to photoelectric receiver 54 (FIG. 4). Photoelectric switch 50A provides a closed circuit 48 when photoelectric receiver 54 does not detect light beam 58 emitted from photoelectric light source 52 due to adsorption of light beam 58 by hydrometer apparatus 20 (FIG. 4A).

Figure 5A:
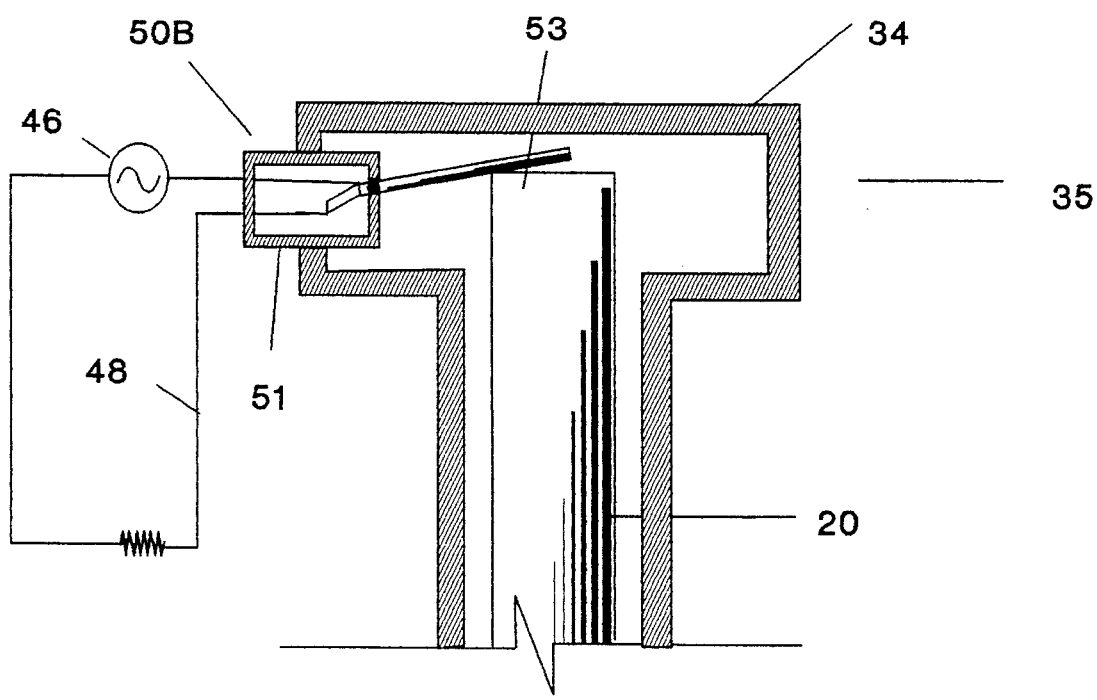

Snap action switch 50B shown in FIG. 5 is comprised of a switch body 51 and an activation lever arm 53. Snap action switch 50B is positioned in switch containment housing 34 where activation lever arm 53 is slightly below dilution water control reference elevation 35. Snap action switch 50B is connected to circuit 48 that provides energy source 46 to valve control 44. Snap action switch 50B provides an open circuit 48 when activation lever arm 53 is below dilution water control reference elevation 35 (FIG. 5). Snap action switch 50B provides a closed circuit 48 when activation lever arm 53 is above dilution water control reference elevation 35 (FIG. 5A).

Figure 6:
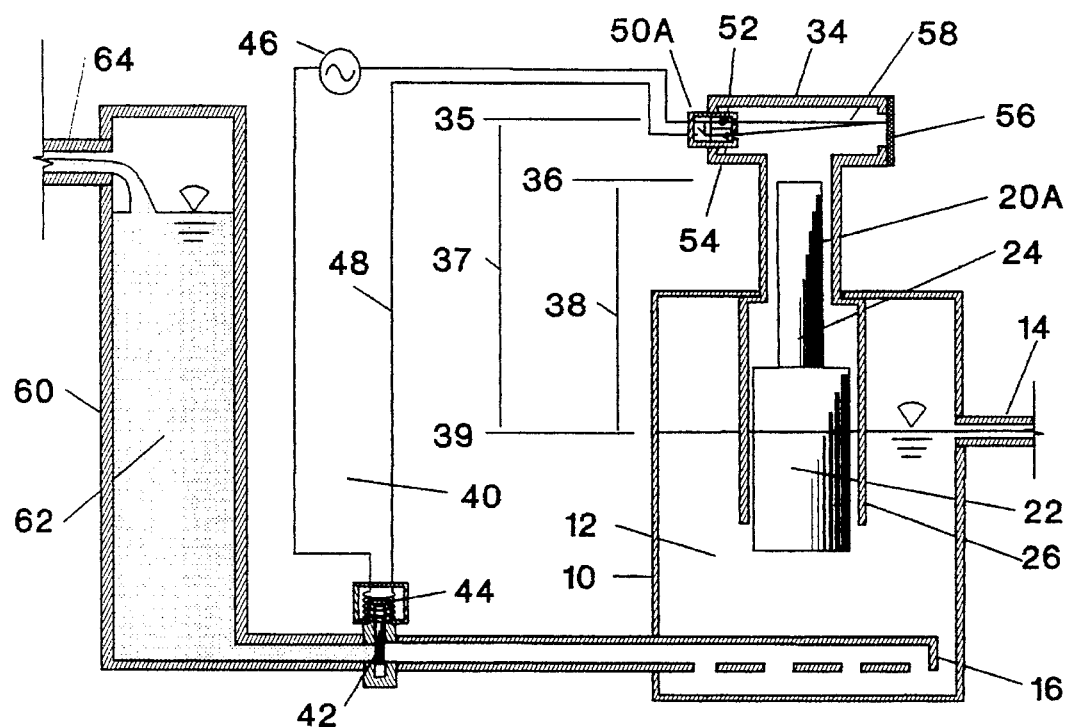
FIGS. 6 and 6A are detailed illustrations of the invention featuring a piston type hydrometer apparatus, and a photoelectric switch.

FIG. 6 is a detail illustration of the invention featuring piston type hydrometer 20A and photoelectric switch 50A. As shown in FIG. 6, piston type hydrometer 20A is suspended in equilibrium in caustic 12 contained in catholyte reservoir 10 having outlet 14 at hydrometer base reference elevation 39. Hydrometer sleeve housing 26 is mounted to catholyte reservoir 10 below switch containment housing 34. Hydrometer sleeve housing 26 is open with switch containment housing 34 and both provide necessary position of piston type hydrometer 20A for communication with photoelectric switch 50A mounted in switch containment housing 34.

Figure 6A:
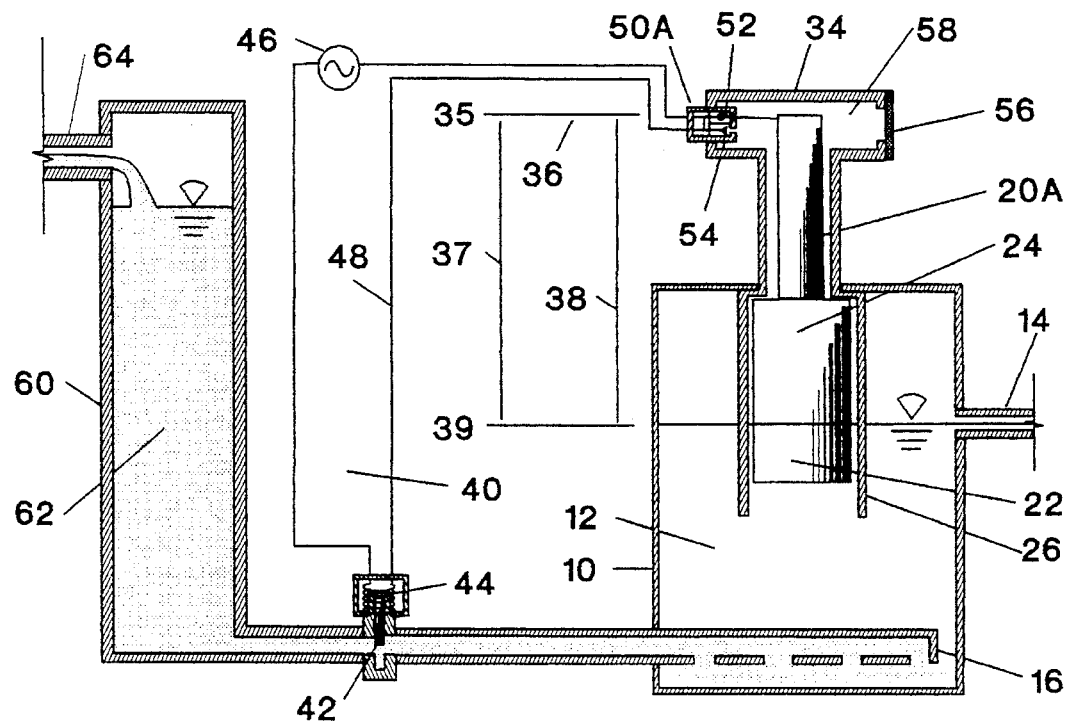

Photoelectric switch 50A opens and closes circuit 48 that supplies energy source 46 to valve control 44. Valve control 44 opens valve 42 when circuit 48 is closed and closes valve 42 when circuit 48 is open. Valve 42 controls flow of dilution water 62 through inlet 16 connected to catholyte reservoir 10. Hydraulic head pressure of dilution water 62 is higher than the hydraulic head pressure of caustic 12 contained in catholyte reservoir 10 to allow flow of dilution water 62 into catholyte reservoir 10 when valve 42 is open. FIG. 6 shows hydrometer 20A below dilution water control reference elevation 35 providing an open circuit 48 to valve control 44. FIG. 6A shows hydrometer 20A above dilution water control reference elevation 35 providing a closed circuit 48 to valve control 44. Dilution water 62 is supplied by a dilution water inlet 64.

Figure 7:
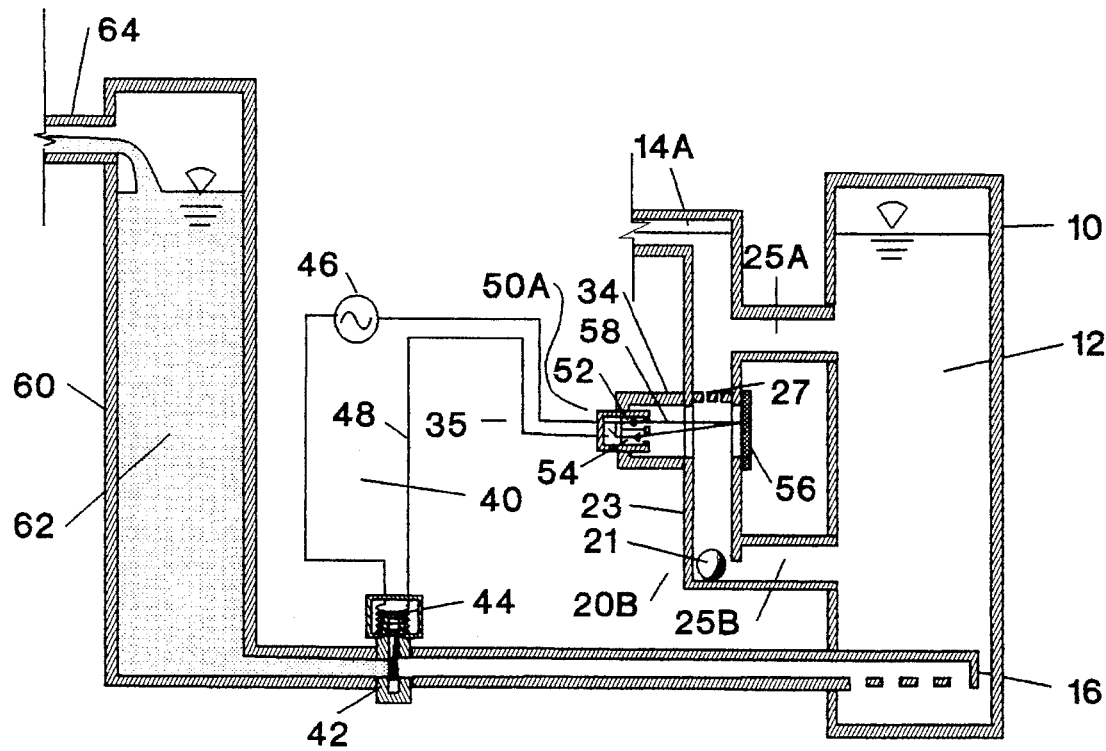
FIGS. 7 and 7A are detailed illustrations of the invention featuring an emerged body type hydrometer apparatus, and a photoelectric switch.

FIG. 7 is a detailed illustration of the invention featuring emerged body type hydrometer 20B and photoelectric switch 50A. As shown in FIG. 7, emerged body type hydrometer 20B is mounted to the exterior of catholyte reservoir 10 with open connection to the interior of catholyte reservoir 10 provided by access ports 25A and 25B. An outlet port 14A is connected to emerged body enclosure 23 which provides means for displaced caustic 12 to exit catholyte reservoir 10.

Emerged body 21 is submerged in caustic 12 contained in emerged body enclosure 23. Position of emerged body 21 is varied with density of caustic 12. When density of caustic 12 is lower than density of emerged body 21, the gravity force caused by the weight of emerged body 21 exceeds the buoyant force caused by caustic 12 allowing emerged body 21 to equalize at bottom of body enclosure 23. When density of caustic 12 exceeds the density of emerged body 21, the gravity force caused by the weight of emerged body 21 is less than the buoyant force caused by caustic 12 allowing emerged body 21 to rise and equalize at emerged body stop 27. Photoelectric switch 50A mounted in switch containment housing 34 is fastened to the outside of emerged body enclosure 23 at a position slightly below emerged body stop 27. Position of switch containment housing 34 in relation to emerged body stop 27 provide the necessary position for communication between emerged body 21 and photoelectric switch 50A.

Photoelectric switch 50A opens and closes circuit 48 that supplies energy source 46 to valve control 44. Valve control 44 opens valve 42 when circuit 48 is closed, and closes valve 42 when circuit 48 is open. Valve 42 controls flow of dilution water 62 through inlet 16 connected to catholyte reservoir 10. Hydraulic head pressure of dilution water 62 is higher than the hydraulic head pressure of caustic 12 contained in catholyte reservoir 10 to allow flow of dilution water 62 into catholyte reservoir 10 when valve 42 is open. Dilution water 62 is supplied by a dilution water inlet 64.

Figure 7A:
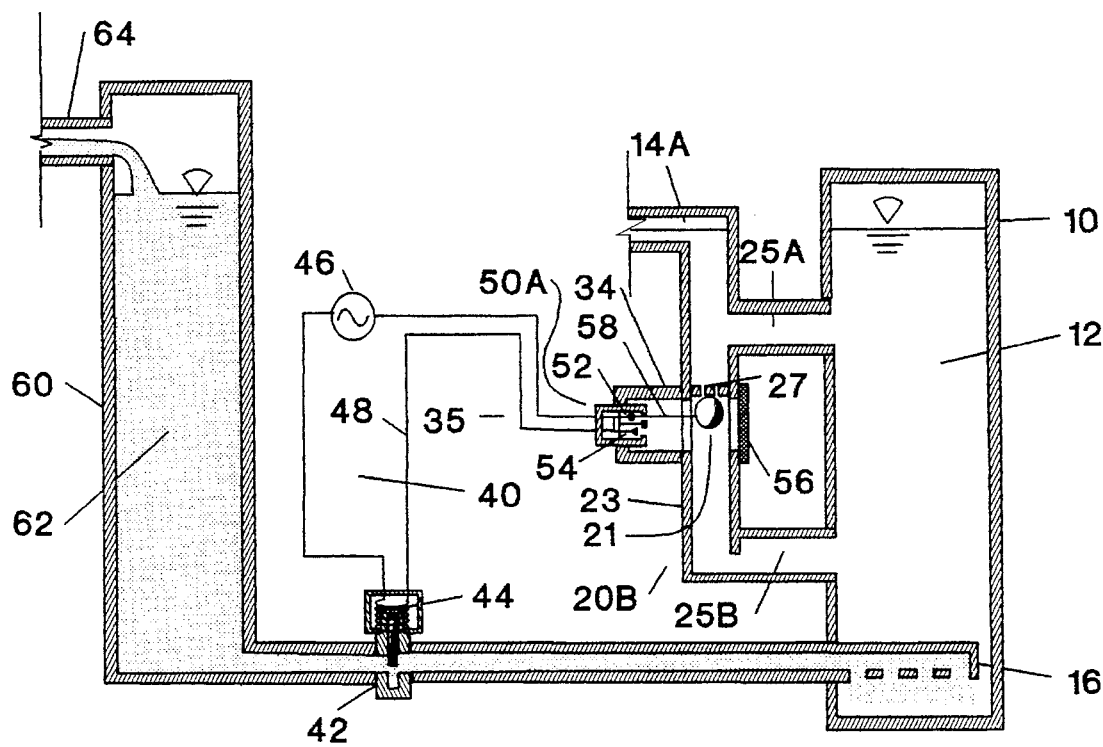

FIG. 7 shows emerged body 21 below dilution water control reference elevation 35 providing an open circuit 48 to valve control 44. FIG. 7A shows emerged body 21 above dilution water control reference elevation 35 providing a closed circuit 48 to valve control 44.

Figure 8:
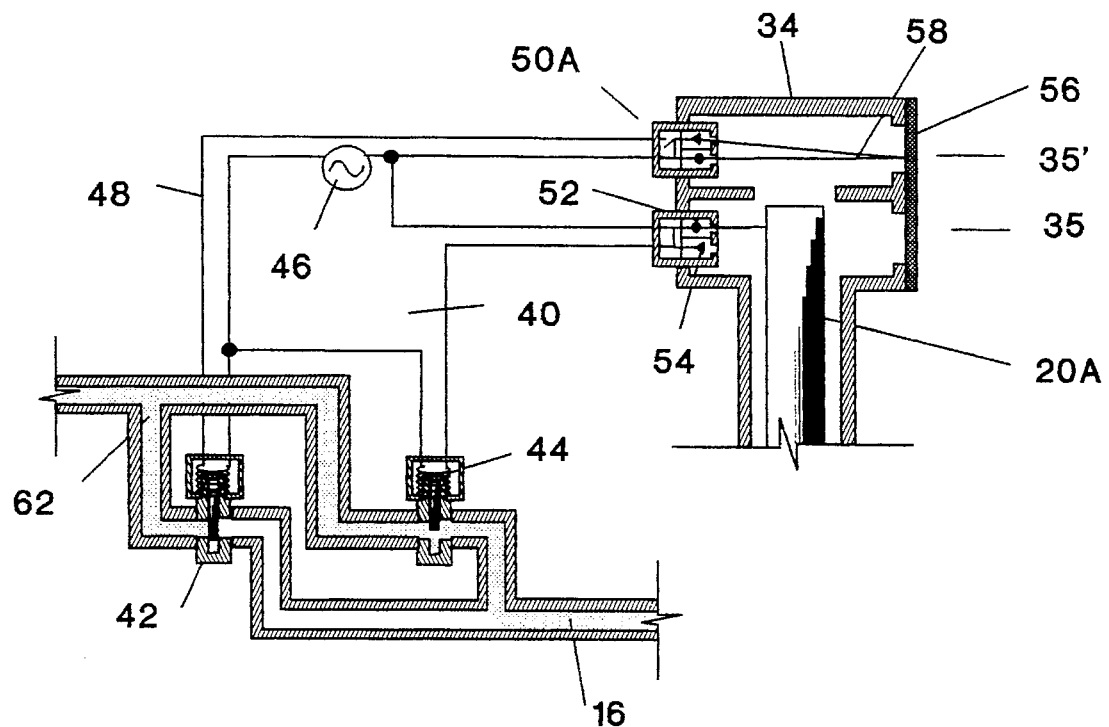
FIGS. 8 and 8A illustrate a multiple dilution water control apparatuses for a single hydrometer apparatus.

The invention can be further improved by adding two or more dilution water control apparatuses 40 to hydrometer apparatus 20. FIG. 8 illustrates a caustic density maintenance system with two dilution water control apparatuses 40 featuring a photoelectric switch 50A and piston type hydrometer 20A.

Figure 8A:
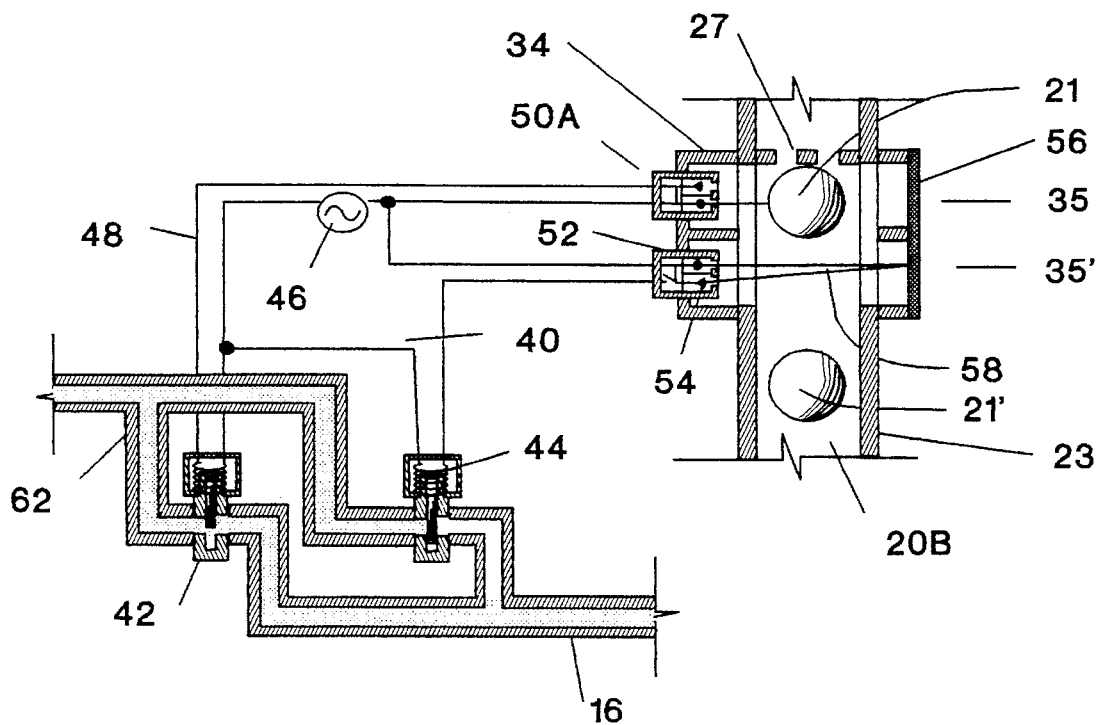

FIG. 8A illustrates a caustic density maintenance system with two dilution water control apparatuses 40 featuring a photoelectric switch 50A and emerged body type hydrometer 20B. When a second photoelectric switch 50A is added to hydrometer apparatus 20, a secondary dilution water control reference elevation 35' is developed. Multiple dilution water control apparatuses 40 in either system provide backup to the dilution system in the event of a failure experienced by one dilution water control apparatuses 40.

Operation of Invention

It should be understood that FIGS. 6 and 7 depict the position of piston type hydrometer 20A (FIG. 6) and emerged body type hydrometer 20B (FIG. 7) when the density of caustic 12 in catholyte reservoir 10 is at an acceptable level. It should also be understood that light beam 59 emitting from photoelectric light source 52 at dilution water control reference elevation 35 is reflecting off of retroreflective target 56, and being detected by photoelectric light receiver 54. When photoelectric light receiver 54 detects light beam 58, photoelectric light switch 50A provides an open circuit 48 between valve control 44 and energy source 46. Since energy source 46 is not provided to valve control 44, valve 42 on inlet 16 remains closed, and not allowing dilution water 63 to enter catholyte reservoir 10.

It should be further understood that FIGS. 6A and 7A depict the position of piston type hydrometer 20A (FIG. 6A) and emerged body type hydrometer 20B (FIG. 7A) when the density of caustic 12 in catholyte reservoir 10 exceeds the maximum desirable density limit. It should also be understood that photoelectric light receiver 54 is not detecting light beam 58 reflecting off of retroreflective target 56 since light beam 58 is intercepted by piston type hydrometer 20A as demonstrated in FIG. 6A, and emerged body 21 of emerged body type hydrometer 20B in FIG. 7A. When light beam 58 is not detected by photoelectric light receiver 54, photoelectric light switch 50A provides a closed circuit 48 between valve control 44 and energy source 46. Since energy source 46 is provided to valve control 44, valve 42 on inlet 16 opens and allows dilution water 63 to enter catholyte reservoir 10.

FIGS. 6 and 6A illustrate piston type hydrometer 20A and photoelectric switch 50A. As the density of caustic 12 increases, buoyant forces on piston type hydrometer 20A increase due to the change in specific gravity of caustic 12. Since the gravitational force of piston type hydrometer 20A remains constant, piston type hydrometer 20A rises as a result of the increased buoyant forces caused by increasing density of caustic 12. Therefore the vertical distance between the top of piston type hydrometer 20A and the surface of caustic 12 increases with increasing density and decreases with decreasing density. This variable vertical distance is referred as hydrometer differential elevation 38.

As the density of caustic 12 increases, piston type hydrometer 20A continues to rise until the top of piston type hydrometer 20A intercepts light beam 58 at dilution water control reference elevation 35 (FIG. 6A). Photoelectric light receiver 54 no longer detects light beam 58, therefore closing circuit 48 between energy source 46 and valve control 44. Closed circuit 48 provides energy source 46 to valve control 44 which opens valve 42 and allows dilution water 62 to flow through inlet 16 into catholyte reservoir 10. As dilution water 62 enters catholyte reservoir 10, caustic 12 is diluted and excess displaced caustic 12 exits catholyte reservoir 10 through outlet 14. Flow of dilution water 62 into catholyte reservoir 10 continues as long as light beam 58 is intercepted by piston type hydrometer 20A.

As caustic 12 is diluted, the density of caustic 12 decreases causing piston type hydrometer 20A to drop below dilution water control reference elevation 35. When piston type hydrometer 20A drops below dilution water control reference elevation 35, light beam 58 reflects off of retroreflective target 56 and is detected by photoelectric light receiver 54. Since photoelectric light receiver 54 detects light beam 58, photoelectric switch 50A opens circuit 48 between energy source 46 and valve control 44. Open circuit 48 removes energy source 46 from valve control 44 which closes valve 42 and stops the flow of dilution water 62 from entering catholyte reservoir 10 (FIG. 6).

The desired density range setting of caustic 12 in catholyte reservoir 10 is obtained by one of two methods when using piston type hydrometer 20A. The first method is to change the specific gravity of piston type hydrometer 20A by adding the appropriate amount of liquid 28 into enclosed body 22 of piston type hydrometer 20A. The second method is to change the activation differential elevation 37 by changing either hydrometer base reference elevation 39 or dilution water control reference elevation 35 (FIGS. 2 and 2A).

FIGS. 7 and 7A illustrate emerged body type hydrometer 20B and photoelectric switch 50A. Emerged body hydrometer 20B includes emerged body 21 which is constructed of a material that has the same specific gravity as caustic 12 at the maximum desirable density limit. When the density of caustic 12 is below the maximum desirable density limit, the gravitational forces caused by the weight of emerged body 21 exceed the buoyant forces imposed by caustic 12, causing emerged body 21 to equalize at the bottom of emerged body enclosure 23. As the density of caustic 12 increases, buoyant forces on emerged body 21 increase due to the change in specific gravity of caustic 12.

When the density of caustic 12 exceeds the maximum desirable density limit, buoyant forces caused by the increased density of caustic 12 exceeds the gravitational forces caused by the weight of emerged body 21. The excessive buoyant forces imposed on emerged body 21, lift emerged body 21 in emerged body enclosure 23. The excessive buoyant forces are overcome by emerged body stop 27 which stops the vertical movement of emerged body 21. As shown in FIG. 7A, emerged body stop 27 provides the necessary position of emerged body 21 to intercept light beam 58 at dilution water control reference elevation 35. Photoelectric light receiver 54 no longer detects light beam 58, therefore closing circuit 48 between energy source 46 and valve control 44. Closed circuit 48 provides energy source 46 to valve control 44 which opens valve 42 and allows dilution water 62 to flow through inlet 16 into catholyte reservoir 10. As dilution water 62 enters catholyte reservoir 10, caustic 12 is diluted and excess displaced caustic 12 exits catholyte reservoir 10 through outlet port 14A. Flow of dilution water 62 into catholyte reservoir 10 continues as long as light beam 58 is intercepted by emerged body 21.

As caustic 12 is diluted, the density of caustic 12 is decreased and the buoyant forces are overcome by the gravitation forces of emerged body 21, causing emerged body 21 to drop below dilution water control reference elevation 35. When emerged body 21 drops below dilution water control reference elevation 35, light beam 58 reflects off of retroreflective target 56 and is detected by photoelectric light receiver 54. Since photoelectric light receiver 54 detects light beam 58, photoelectric switch 50A opens circuit 48 between energy source 46 and valve control 44. Open circuit 48 removes energy source 46 from valve control 44 which closes valve 42 and stops the flow of dilution water 62 from entering catholyte reservoir 10 (FIG. 7).

The desired density range setting of caustic 12 in catholyte reservoir 10 is controlled by the density rating of emerged body 21. The advantage of using emerged body type hydrometer 20B over piston type hydrometer 20A is that the dilution water control reference elevation is set independent of the surface elevation of caustic 12 in catholyte reservoir 10. Therefore, emerged body type hydrometer 20B can be used in a catholyte reservoir 10 that experiences variations in the surface elevation of caustic 12.

Conclusions, Ramifications, and Scope of Invention

As with the prior art, the novel apparatus depicted above provides an automated means to prevent density of a caustic from exceeded an unacceptable high concentration in the catholyte reservoir. In addition, this invention provides means to maintain a lower acceptable concentration of caustic solution to maintain the necessary catholyte conductivity. The invention further provides increased reliability of the automatic dilution operation by eliminating the plugging possibility of the dilution stream nozzle described in the prior art, provides dilution water only when required thus eliminating the need to recycle water and reduce the cost of dilution water pre-treatment, and provides a means to add the dilution water at a location that promotes natural mixing and a virtually homogeneous caustic solution.

It will thus be seen that the objects set forth above, and those made apparent from the foregoing description, are efficiently attained and since certain changes may be made in the above construction without departure from the scope of the invention, it is intended that all matters contained in the foregoing description or shown in the accompanying shall be interpreted as illustrative and not in a limiting sense. One example would be to connect the dilution water control system to a telemetry logic controller to allow centralized control of several dilution water control systems.

It is also to be understood that the following claims are intended to cover all of the generic and specific features of the invention herein described, and all statements of the scope of the invention which, as a matter of language, might be said to fall there between.

Now that the invention has been described, what is claimed is:

1. An apparatus for regulating concentration of a caustic in a chlor-alkali cell system containing, a caustic reservoir holding said caustic of a predetermined concentration, a dilution water reservoir containing a dilution water for reducing concentration of said caustic to said predetermined concentration, a conduit interconnecting said dilution water reservoir and said caustic reservoir, and a control valve governing said conduit interconnecting said dilution water reservoir and said caustic reservoir, said regulating apparatus comprising:

a caustic reservoir inlet connected to said conduit in said caustic reservoir;

an object body;

said object body being floatingly arranged in said caustic reservoir and being positionally adjustable in said caustic reservoir in response to variations in the concentration of said caustic in said caustic reservoir;

a housing means for guiding said object body for upward and downward directed movements in said caustic reservoir to said variations in said concentration of said caustic in said caustic reservoir;

said housing means being connected to a switch means;

said housing means containing an object body stop firmly attached at a predetermined cross-section of said housing means;

said object body stop submerged in said caustic in said caustic reservoir;

said object body stop having a predetermined number of perforations allowing unrestricted flow and mixing of said caustic in said housing means;

said switch means operatively associated with a predetermined position of said object body and operatively connected to said control valve;

said object body is upwardly restricted by said object body stop at said predetermined position operatively associated with said switch means; and said object body, in said predetermined position in said housing means acting upon said switch means and thereby operating said control valve for passing said dilution water from said dilution water reservoir to said caustic reservoir until said concentration of said caustic in said caustic reservoir is reduced to said predetermined concentration.

2. The apparatus as defined in claim 1, wherein said caustic reservoir inlet is positioned at a predetermined location within said caustic reservoir directing sufficient mixing of said dilution water with said caustic in said caustic reservoir.

3. The apparatus as defined in claim 1, wherein said switch means constitute a photoelectric switch.

4. An apparatus for regulating concentration of a liquid comprising:

a housing means connected to a reservoir containing said liquid of a predetermined concentration;

said housing means being positionally attached to said reservoir allowing flow of said liquid through said housing means;

a dilution reservoir containing a dilution liquid for reducing concentration of said liquid to said predetermined concentration;

a conduit interconnecting said dilution reservoir and said reservoir;

a control valve governing said conduit interconnecting said dilution reservoir and said reservoir;

a reservoir inlet connected to said conduit in said reservoir;

an object body;

said object body being floatingly arranged in said housing means and being positionally adjustable for upward and downward directed movements in said housing means in response to variations in the concentration of said liquid in said reservoir;

said housing means being connected to a switch means;

said housing means containing an object body stop firmly attached at a predetermined cross-section of said housing means;

said object body stop submerged in said liquid in said housing means;

said object body stop having a predetermined number of perforations allowing unrestricted flow and mixing of said liquid in said housing means;

said switch means operatively associated with a predetermined position of said object body and operatively connected to said control valve; and said object body is upwardly restricted by said object body stop at said predetermined position operatively associated with said switch means;

said object body, in said predetermined position in said housing means acting upon said switch means and thereby operating said control valve for passing said dilution liquid from said dilution reservoir to said reservoir until said concentration of said liquid in said reservoir is reduced to said predetermined concentration.

5. The apparatus as defined in claim 4, wherein said reservoir inlet is positioned at a predetermined location within said reservoir directing sufficient mixing of said dilution liquid with said liquid in said reservoir.

6. The apparatus as defined in claim 4, wherein said switch means constitute a photoelectric switch.

7. A method of regulating concentration of a caustic in a chlor-alkali cell system containing, a caustic reservoir holding said caustic of a predetermined concentration, a dilution water reservoir containing a dilution water for reducing concentration of said caustic to said predetermined concentration, a conduit interconnecting said dilution water reservoir and said caustic reservoir, a caustic reservoir inlet, a control valve governing said conduit interconnecting said dilution water reservoir and said caustic reservoir, and a switch governing said control valve, said method comprising the steps of:

positionally adjusting an object body in buoyant response to the concentration of said caustic in said caustic reservoir where said object body is positionally associated to an object body stop submerged in said caustic at a predetermined reference datum;

sensing a predetermined position of said object body in said caustic reservoir which corresponds to said predetermined reference datum indicative of a caustic concentration that exceeds said predetermined concentration of said caustic; and regulating said caustic concentration when said predetermined position of said object body activating said switch governing said control valve and passing said dilution water from said dilution water reservoir through said control valve into said caustic reservoir as long as said caustic concentration of said caustic in said caustic reservoir exceeds said predetermined concentration.

8. The method as defined in claim 7, further including the steps of:

arranging said caustic reservoir inlet at a predetermined location within said caustic reservoir directing sufficient mixing of said dilution water with said caustic in said caustic reservoir.

* * * * *